(12) United States Patent
Jung et al.

(10) Patent No.: US 9,363,838 B2
(45) Date of Patent: Jun. 7, 2016

(54) METHOD FOR OPERATING BASED ON DELAY-TOLERANCE INFORMATION HANDLING IN WIRELESS COMMUNICATION SYSTEM AND APPARATUS SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/433,451

(22) PCT Filed: Oct. 4, 2013

(86) PCT No.: PCT/KR2013/008903
§ 371 (c)(1),
(2) Date: Apr. 3, 2015

(87) PCT Pub. No.: WO2014/054916
PCT Pub. Date: Apr. 10, 2014

(65) Prior Publication Data
US 2015/0230276 A1    Aug. 13, 2015

Related U.S. Application Data

(60) Provisional application No. 61/709,941, filed on Oct. 4, 2012.

(51) Int. Cl.
*H04W 76/02* (2009.01)
*H04W 72/06* (2009.01)
(Continued)

(52) U.S. Cl.
CPC ................ *H04W 76/02* (2013.01); *H04W 8/02* (2013.01); *H04W 28/08* (2013.01); *H04W 36/00* (2013.01); *H04W 36/0083* (2013.01); *H04W 72/06* (2013.01); *H04W 88/08* (2013.01)

(58) Field of Classification Search
CPC . H04W 76/00; H04W 76/02; H04W 36/0083; H04W 88/08
See application file for complete search history.

(56) References Cited

U.S. PATENT DOCUMENTS

2009/0067329 A1    3/2009  Sumasu et al.
2011/0199898 A1    8/2011  Cho et al.
(Continued)

FOREIGN PATENT DOCUMENTS

KR    10-2011-0094408 A    8/2011
KR    10-2011-0134464 A    12/2011
(Continued)

*Primary Examiner* — Anh Ngoc Nguyen
(74) *Attorney, Agent, or Firm* — Birch, Stewart, Kolasch & Birch, LLP

(57) ABSTRACT

Disclosed is an operating method of a serving base station in wireless communication system. The method comprises obtaining delay-tolerance information with respect to user equipment, and operating based on the delay-tolerance information. The delay-tolerance information indicates whether the user equipment is a delay-tolerant user equipment (UE), which allows a service delay. Provided is a delay-tolerance information-based operating method of user equipment in a wireless communication system. The method comprises generating delay-tolerance information and transmitting delay-tolerance information to a network. The delay-tolerance information indicates whether the user equipment is a delay-tolerant user equipment (UE), which allows a service delay. The network is operated based on the delay-tolerance information.

17 Claims, 10 Drawing Sheets

(51) Int. Cl.
  *H04W 8/02* (2009.01)
  *H04W 36/00* (2009.01)
  *H04W 28/08* (2009.01)
  *H04W 88/08* (2009.01)

(56) References Cited

U.S. PATENT DOCUMENTS

| | | | | |
|---|---|---|---|---|
| 2011/0268026 A1* | 11/2011 | Ronneke | ............ | H04W 72/1242 370/328 |
| 2012/0003941 A1 | 1/2012 | Xiao et al. | | |
| 2012/0202556 A1* | 8/2012 | Mori | .................... | H04W 36/30 455/525 |
| 2012/0218889 A1* | 8/2012 | Watfa | .................... | H04W 60/04 370/230 |
| 2012/0250501 A1* | 10/2012 | Lee | .................... | H04W 76/007 370/229 |
| 2013/0028184 A1* | 1/2013 | Lee | ........................ | H04W 8/22 370/328 |
| 2013/0044702 A1* | 2/2013 | Jayaraman et al. | ... | H04W 48/06 370/329 |
| 2013/0324141 A1* | 12/2013 | Jung | .................... | H04W 4/005 455/450 |

FOREIGN PATENT DOCUMENTS

KR  10-2012-0094369 A  8/2012
WO  2011/063825 A1  6/2011

* cited by examiner

METHOD FOR OPERATING BASED ON DELAY-TOLERANCE INFORMATION HANDLING IN WIRELESS COMMUNICATION SYSTEM AND APPARATUS SUPPORTING SAME

CROSS REFERENCE TO RELATED APPLICATIONS

This application is the National Phase of PCT/KR2013/008903 filed on Oct. 04, 2013, which claims priority under 35 U.S.C. 119(e) to U.S. Provisional Application No. 61/709,941 filed on Oct. 04, 2012, all of which are hereby expressly incorporated by reference into the present application.

BACKGROUND OF THE INVENTION

1. Field of the Invention

The present invention relates to wireless communication, and more particularly, to a method for operating based on delay-tolerance information handling in a wireless communication system and an apparatus supporting the same.

2. Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

User equipment needs to establish connection with a network before receiving a service in order to receive the service. To this end, the user equipment requests the connection establishment and when the request is permitted, the user equipment enters a connection state to receive the service from the network. The network may approve or reject the connection establishment request from the user equipment according to a current environment. When the user equipment is not appropriate to a network which the user equipment currently intends to establish connection with or a normal service cannot be provided due to a complicated current communication environment, the network may reject the request from the user equipment.

During a connection establishment procedure between the user equipment and the network, the network may obtain information on the user equipment. Delay-tolerance information indicating whether the corresponding user equipment is delay-tolerant UE may be provided as one of the UE information. The network may determine whether to permit or reject the connection establishment request from the UE according to the delay-tolerance information and a current network situation.

In the situation in which the connection of the UE with the network is established, a delay-tolerance characteristic of the UE may be changed. However, the network that cannot obtain the delay-tolerance information on the UE depending on the change in delay-tolerance characteristic is operated based on the existing known information. Consequently, as the service for a non-delay tolerant UE is delayed and the service is continuously provided to the delay-tolerant UE, inefficiency may increase in terms of radio resource management and providing the service to the UE.

SUMMARY OF THE INVENTION

The present invention has been made in an effort to provide a method for operating based on delay-tolerance information handling in a wireless communication system and an apparatus supporting the same.

In an aspect, an operating method of a serving base station in wireless communication system is provided. The method comprises obtaining delay-tolerance information with respect to user equipment and operating based on the delay-tolerance information. The delay-tolerance information indicates whether the user equipment is a delay-tolerant user equipment (UE), which allows a service delay.

The method may further comprise determining whether acquiring the delay tolerance information is required. The acquiring of the delay tolerance information may be performed when it is determined that acquiring the delay tolerance information is required.

When the serving base station verifies that a network overload environment occurs, it may be determined that acquiring the delay tolerance information is required.

When a notification that the network overload environment occurs is received from another network node, it may be determined that acquiring the delay tolerance information is required.

The acquiring of the delay tolerance information with respect to the UE may include requesting the delay tolerance information to the UE, and receiving the delay tolerance information from the UE as a response to the request.

The acquiring of the delay tolerance information with respect to the UE may include requesting the delay tolerance information to a mobility management entity (MME) managing the delay tolerance information, and receiving the delay tolerance information from the MME as a response to the request.

The delay tolerance information may be updated through a network by the UE when a delay tolerance characteristic of the UE is changed.

The operating based on the delay-tolerance information may include determining whether to hand over the UE based on the delay tolerance information.

The operating based on the delay-tolerance information may include determining whether to release radio resource control (RRC) connection with the UE.

The operating based on the delay-tolerance information may include forwarding the delay tolerance information to a target base station for hand-over, and whether to hand over the UE is determined by the target base station based on the delay tolerance information.

When only a delay tolerant radio bearer is configured in the UE, the delay tolerance information may indicate that the UE is the delay tolerant UE.

When only a delay tolerance application is executed by the UE, the delay tolerance information indicates that the UE is the delay tolerant UE.

When at least one is satisfied, of a case in which at least one delay tolerance radio bearer is configured in the UE and a case in which at least one delay tolerance application is configured by the UE, the delay tolerance information may indicate that the UE is the delay tolerance UE.

When other type of radio bearer is configured in the UE or other type of application is executed by the UE, the delay tolerance information may further indicate at least one of the other type of radio bearer and the other type of application.

In another aspect, a wireless device that operates in wireless communication system is provided. The device comprises a radio frequency (RF) unit which transmits or receives a radio signal and a processor which operates in functional association with the RF unit. The processor is configured to obtain delay-tolerance information with respect to user equipment and operate based on the delay-tolerance information, and the delay-tolerance information indicates whether the user equipment is a delay-tolerant user equipment (UE), which allows a service delay.

In still another aspect, a delay tolerance information based operating method performed by user equipment in wireless communication system is provided. The method comprises generating delay tolerance information and transmitting the delay tolerance information to a network. The delay-tolerance information indicates whether the user equipment is a delay-tolerant user equipment (UE), which allows a service delay and the network is operated based on the delay-tolerance information.

The transmitting of the delay tolerance information to a network may include receiving a delay tolerance information request from a serving base station fo the UE, and transmitting the delay tolerance information to the serving base station as a response to the delay tolerance information request.

The generating of the delay-tolerance information may include when a delay tolerance characteristic of the UE is changed, updating the delay tolerance information to indicate whether the UE is the delay tolerant UE according to the delay tolerance characteristic of the UE. The transmitting of the delay tolerance information to a network may include when the delay tolerance information is updated, transmitting the updated delay tolerance information to the network.

According to embodiments of the present invention, a network can obtain latest delay-tolerance information on user equipment and know a delay-tolerance characteristic of the user equipment even when the delay-tolerance characteristic of the user equipment is changed. Therefore, even under an environment in which overload occurs in the network, the network can efficiently manage radio resource by using the delay-tolerance information. That is, the network provides a service by assigning the radio resource to the delay-tolerant user equipment at a comparatively low priority and provides the service by assigning the radio resource to non-delay-tolerant user equipment at a comparatively high priority to efficiently manage the radio resource and provide the service.

DESCRIPTION OF EXEMPLARY EMBODIMENTS

Figure 1:
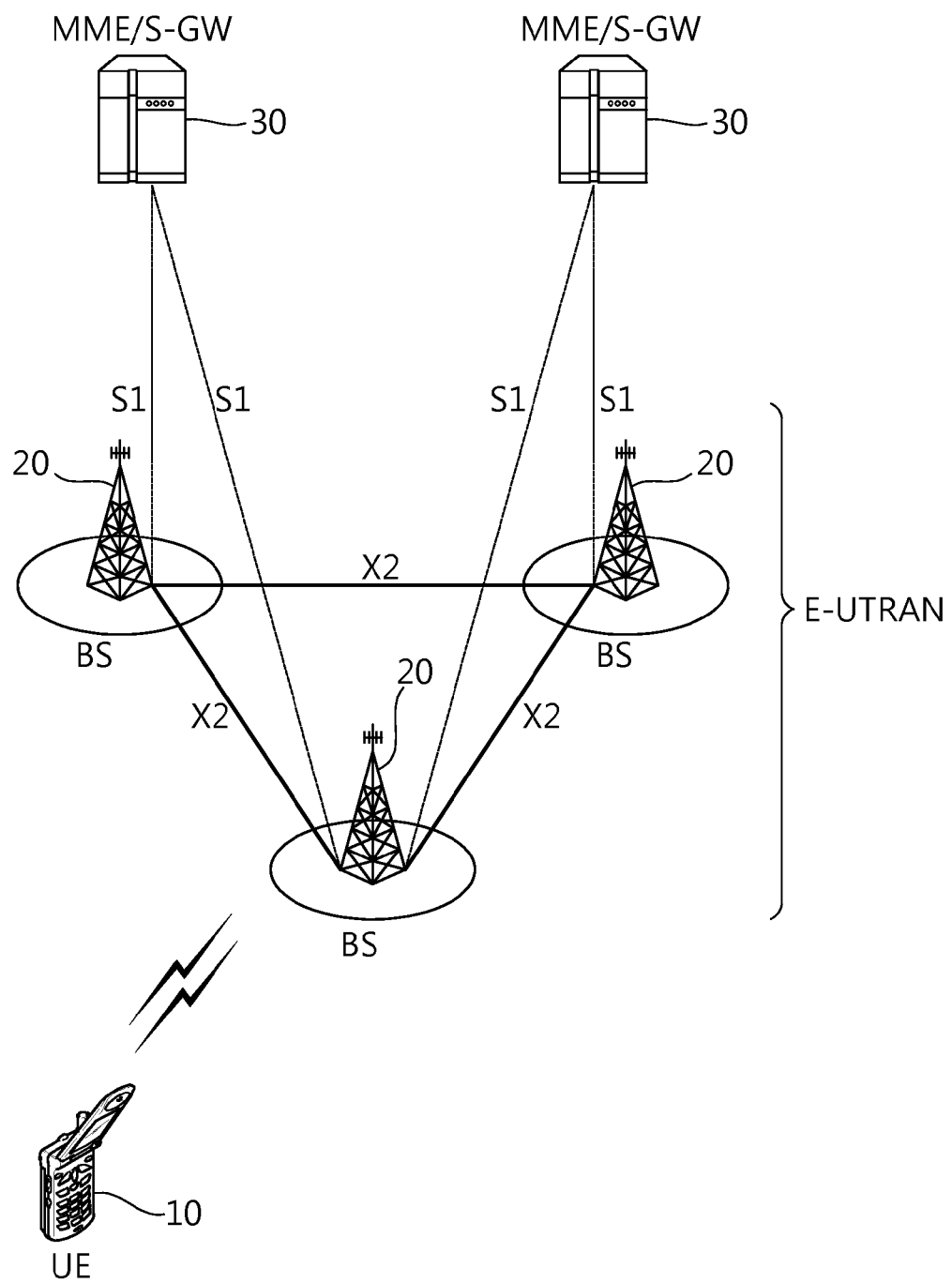
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
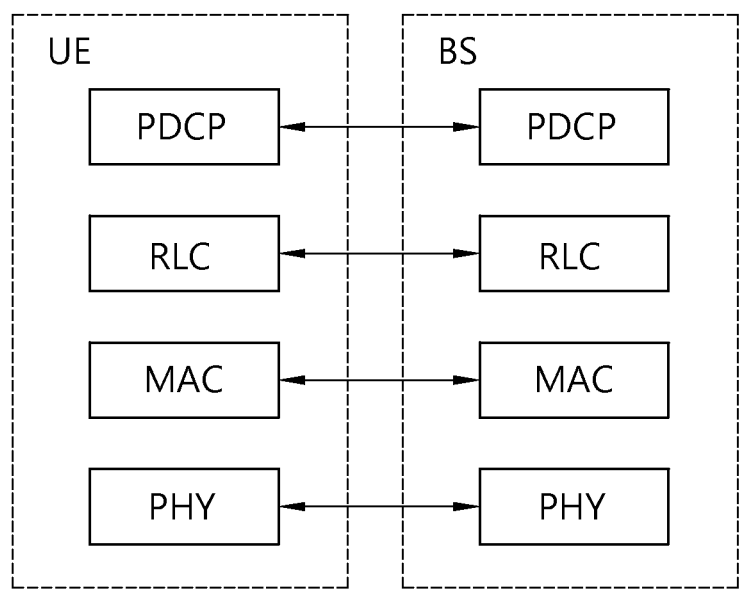
FIG. 2 is a block diagram illustrating a radio protocol architecture for a user plane.
Figure 3:
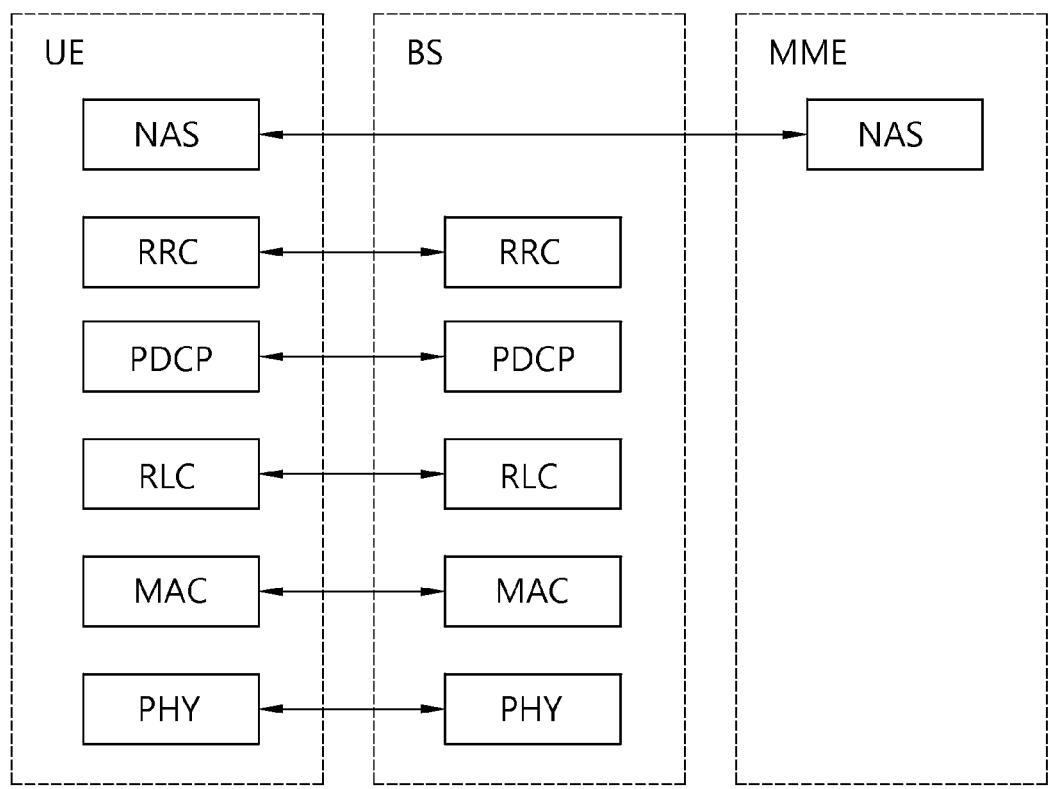
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. System information is divided into a master information block (MIB) and a plurality of system information blocks (SIB).

The MIB may include a limited number of parameters required to be obtained for other information from a cell, which are most requisite and are most frequently transmitted. User equipment first finds the MIB after downlink synchronization. The MIB may include information including a downlink channel bandwidth, a PHICH configuration, an SFN that supports synchronization and operates as a timing reference, and an eNB transmission antenna configuration. The MIB may be broadcast-transmitted through a BCH.

System information block type 1 (SIB1) among the included SIBs is transmitted while being included in a message of "SystemInformationBlockType1" and SIBs other than the SIB1 is transmitted while being included in a system information message. Mapping the SIBs to the system information message may be flexibly configured by scheduling information list parameters included in the SIB1. However, each SIB may be included in a single system information message and only SIBs having the same scheduling requirement value (e.g., cycle) may be mapped to the same system information message. Further, system information block type 2 (SIB2) is continuously mapped to a system information message corresponding to a first entry in a system information message list of a scheduling information list. A plurality of system information messages may be transmitted within the same cycle. The SIB1 and all information system information messages are transmitted through a DL-SCH.

In addition to the broadcast transmission, in the E-UTRAN, the SIB1 may be dedicatedly signaled while including a parameter similarly to a value set in the related art and in this case, the SIB1 may be transmitted while being included in an RRC connection reconfiguration message.

The SIB1 includes information associated with a user cell access and defines scheduling of other SIBs. The SIB1 may include PLMN identifiers of the network, a tracking area code (TAC) and a cell ID, a cell barring status indicating whether the cell is a cell which may camp on, a lowest receiving level required in the cell, which is used as a cell reselection reference, and information associated with transmission time and cycle of other SIBs.

The SIB2 may include radio resource configuration information common to all UE. The SIB2 may include information associated with an uplink carrier frequency and an uplink channel bandwidth, an RACH configuration, a paging configuration, an uplink power control configuration, a sounding reference signal configuration, and a PUCCH configuration and a PUSCH configuration supporting ACK/NACK transmission.

The UE may apply acquisition and change sensing procedures of the system information only to a PCell. In an SCell, the E-UTRAN may provide all system information associated with an RRC connection state operation through dedicated signaling when the corresponding SCell is added. When the system information associated with the configured SCell is changed, the E-UTRAN may release and add the considered SCell later and the release and addition may be performed together with the single RRC connection reconfiguration message. The E-UTRAN may configure parameter values other than a value broadcasted in the considered SCell through the dedicated signaling.

The UE needs to guarantee validity of specific type system information and the system information is referred to as required system information. The required system information may be defined as follows.

In the case where the UE is in an RRC idle state: It needs to be guaranteed that the UE has valid versions of the MIB and the SIB1 as well as the SIB2 to SIB8 and this may be followed by supporting a considered RAT.

In the case where the UE is in an RRC connection state: It needs to be guaranteed that the UE has the valid versions of the MIB, the SIB1, and the SIB2.

In general, the validity of the system information may be guaranteed within a maximum of 3 hours after the system information is acquired.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
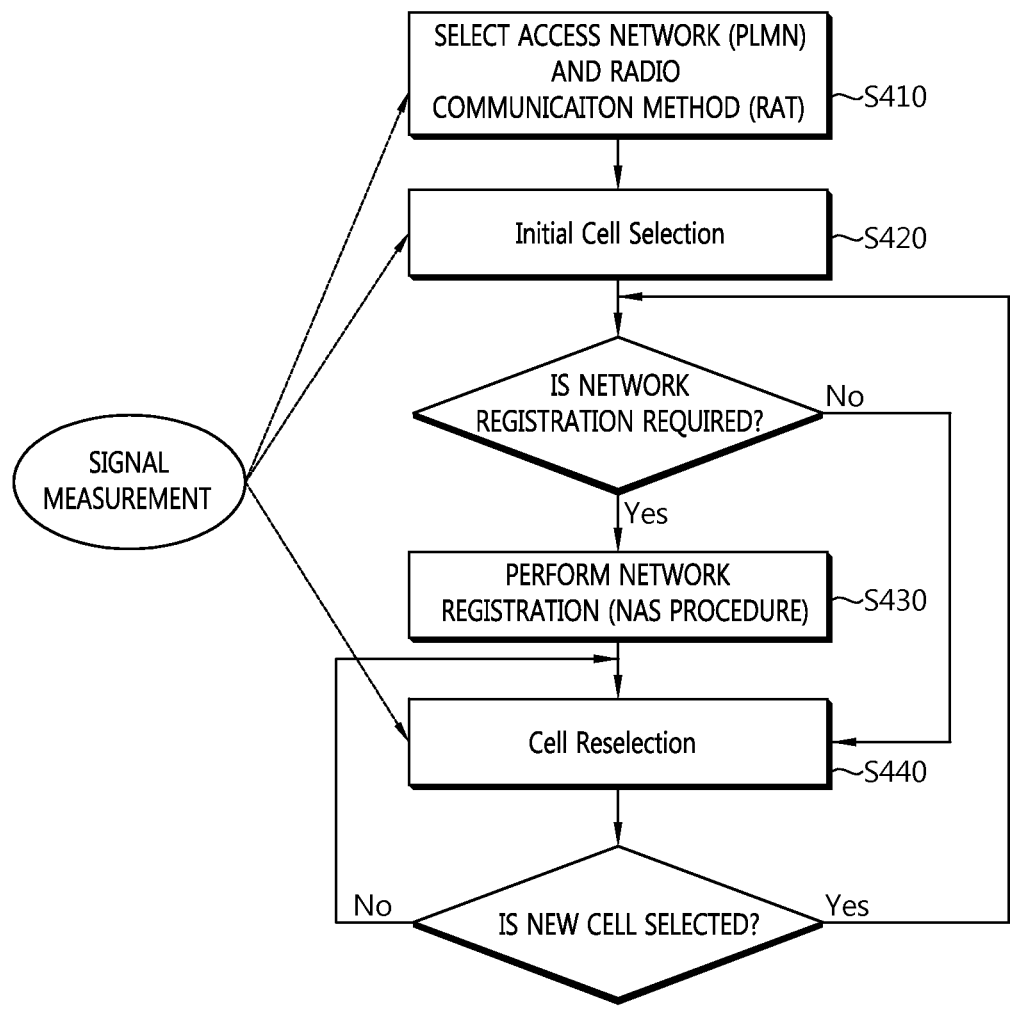
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
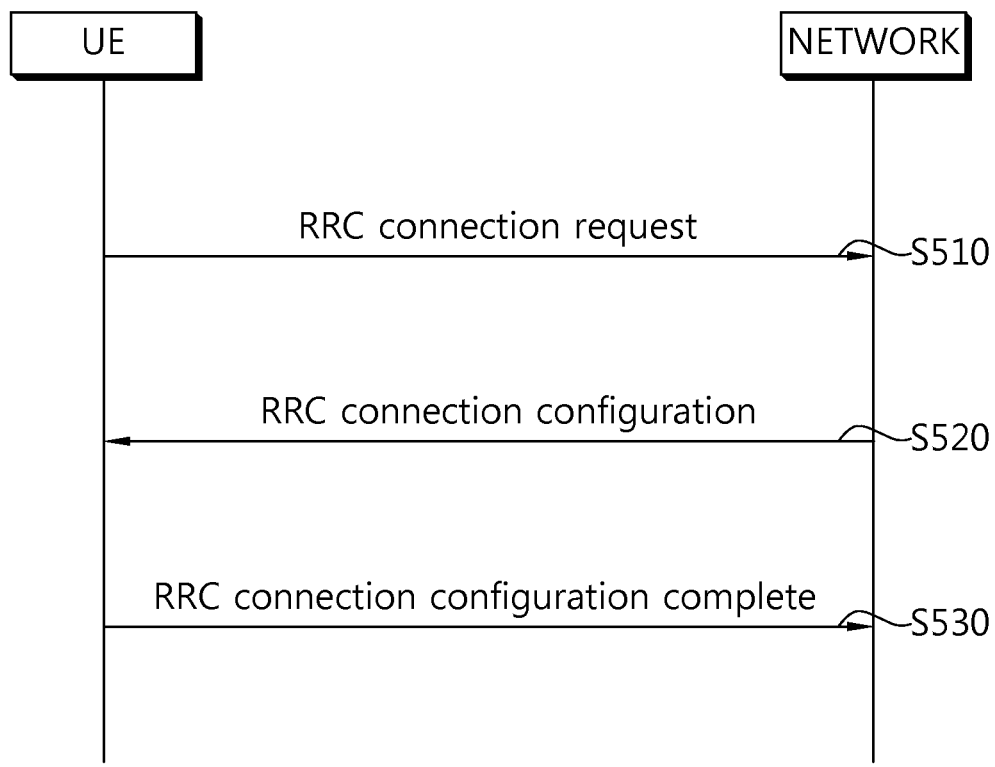
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
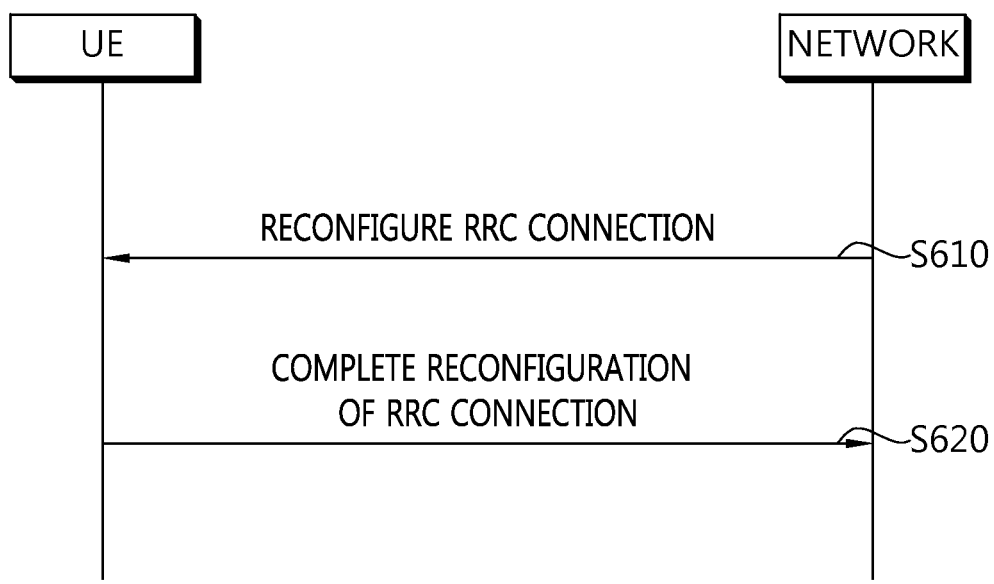
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst},\ R_n = Q_{meas,n} - Q_{offset} \qquad \text{[Equation 1]}$$

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion $R_s$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_s$ of the serving cell and the $R_n$ of the neighbor cell according to the Equation 1, regards the cell having the largest ranking criterion value as the highest ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:
- a case where the UE determines that there is a serious problem in the downlink communication link quality based on the radio quality measuring result of the PHY layer (determines that the quality of the PCell is low during the RLM.
- a case where the UE determines that there is a problem in the uplink transmission when a random access procedure is continuously failed in a MAC sub-layer.
- a case where the UE determines that there is a problem in the uplink transmission when uplink data transmission is continuously failed in an RLC sub-layer.
- a case where the UE determines that the handover is failed.
- a case where a massage received by the UE does not pass through an integrity check.

Hereinafter, the RRC connection re-establishment procedure will be described in more detail.

Figure 7:
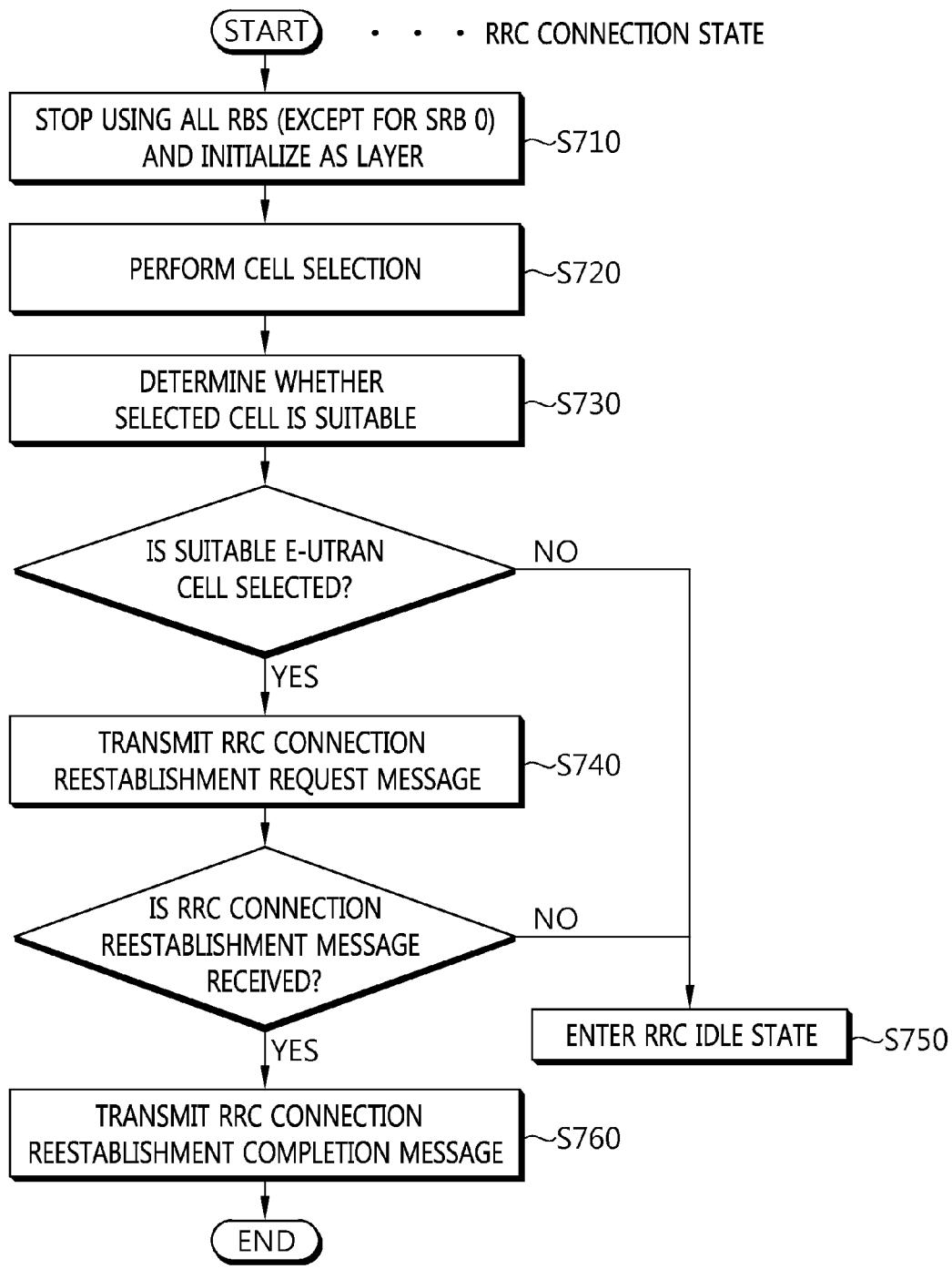
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Hereinafter, an operation of the UE and the network associated with RRC connection rejection will be described. In the RRC connection establishment procedure, when the network transmits an RRC connection rejection message to the UE in response to an RRC connection request message, the network does not permit the UE to access the corresponding cell and/or the RAT of the corresponding cell according to a current network situation. To this end, the network may encapsulate in the RRC connection rejection message information associated with a cell reselection priority and/or access limit information for limiting cell access so as to stop the UE from accessing the network.

The network may encapsulate in the RRC connection rejection message lowest priority request information indicating that a lowest priority is to be applied when the UE performs the cell reselection. The lowest priority request information may include lowest priority type information indicating a type to which the lowest priority is applied and lowest priority timer information which is application duration of the lowest priority. The lowest priority type information may be configured to instruct the lowest priority to be applied to a frequency of a cell that transmits the RRC connection rejection message or the lowest priority to be applied to all frequencies of the RAT of the corresponding cell.

When the UE receives the RRC connection rejection message including the lowest priority request information, the UE starts a timer set as the lowest priority application duration and applies the lowest priority to a target indicated by the lowest priority type information to perform the cell reselection.

Meanwhile, when the lowest priority information is provided through the RRC connection rejection message, the lowest priority information may collide with a reselection priority signaled by the network. In this case, the UE may be implemented to be operated by preferentially applying the lowest priority to a specific frequency according to the lowest priority information provided through the RRC connection rejection message. Additionally, the lowest priority information depending on the RRC connection rejection message may collide with application of an implicit priority depending on a UE-originated indication like a multimedia broadcast multicast service (MBMS) interest indication, a closed subscriber group (CSG) cell associated proxy indication, and an IDC interference associated IDC indication. As a result, a priority to be preferentially applied may follow the implementation of the UE or the network.

The network may encapsulate wait time information in RRC connection information in order to limit access of the UE to the network. The UE that receives the RRC connection rejection message including the wait time information may set a wait timer as long as the indicated duration and start the wait timer. While the wait timer is driven, the UE may not perform the RRC connection establishment procedure for accessing the network.

The network may encapsulate extended stand-by time information in the RRC connection rejection message for delay tolerant UE which is UE more adaptive to a delayed service. The delay tolerant UE may be UE in which an RB for low priority NAS signaling is configured. Herein, the low priority NAS signaling as a concept introduced to provide a mechanism for congestion control may be signaling processed with a lower priority than high priority signaling during a congestion period.

The extended stand-by time information may be implemented to indicate an extended stand-by duration value longer than a value of the stand-by time information. The UE may access the network based on the extracted stand-by time information when extended stand-by time information is included in the RRC connection rejection message and the corresponding UE is the delay tolerant UE. On the contrary, when the UE is not the delay tolerant UE, the UE may access the network based on the stand-by time information.

The UE may currently provide to the network the delay tolerance information indicating whether the connection establishment request has the delay tolerance characteristic during the RRC connection establishment procedure. In more detail, the delay tolerance information may be included in the RRC connection establishment request message transmitted by the UE. The network may use the delay tolerance information provided from the UE in determining whether to permit the connection establishment request of the UE based on a network load situation. Consequently, the base station knows whether the connection establishment request from the UE has the delay tolerance characteristic through the delay tolerance information in the RRC connection request message and the cognition situation may be continued.

Meanwhile, the delay tolerance characteristic may be changed with respect to the UE that enters the RRC connection state. That is, the delay tolerance characteristic may be changed while the UE established and maintains connection through a specific RRC connection establishment procedure with the network. For example, an RB for general priority NAS signaling may be additionally configured while the delay tolerant UE maintains the RRC connection state. Alternatively, an RB for low priority NAS signaling may be additionally configured while the non-delay tolerant UE maintains the RRC connection state and the RB for the general priority NAS signaling is ended, and as a result, the non-delay tolerant UE may be the delay tolerant UE. However, since the network may not know change details of the delay tolerance characteristic of the UE, an inefficient network operation to which a current delay tolerance characteristic of the UE is not reflected may be caused.

In order to solve the aforementioned problem, proposed is a method for operating by handling the delay tolerance information so as to operate the network by network's acquiring/ maintaining the latest delay tolerance information on the UE even though although the delay tolerance characteristic of the UE is changed while the UE is continuously in the RRC connection state. As the method for handling the delay tolerance information so as for the network to acquire/maintain the latest delay tolerance information on the UE, a method in which the network implicitly requests the information to the UE and a method in which the network acquires the information from a separate entity having the latest delay tolerance information on the UE may be considered.

Figure 8:
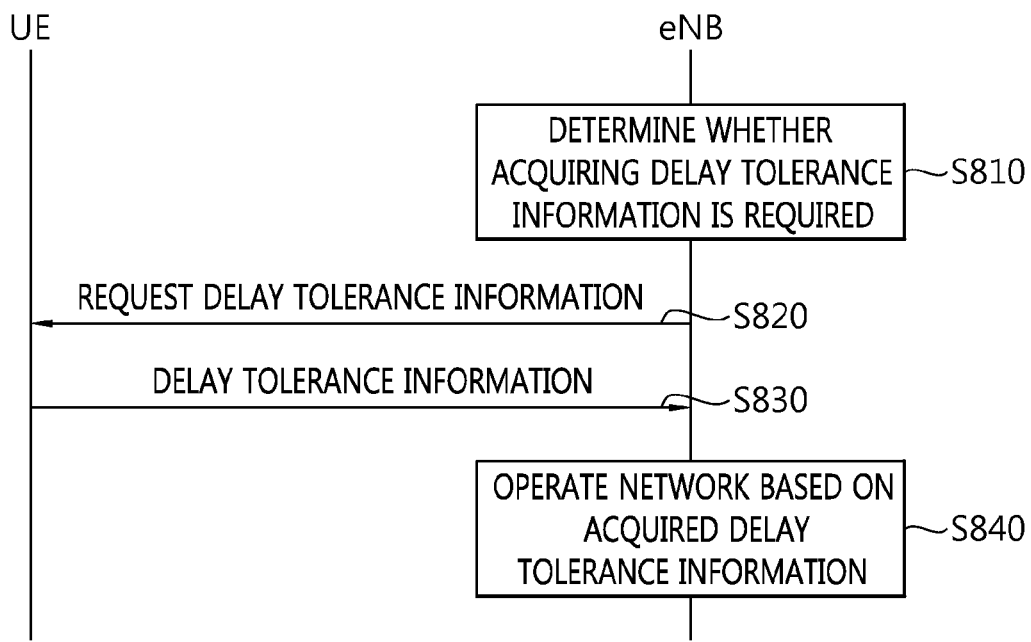
FIG. 8 is a flowchart illustrating a method for operating based on delay tolerance information handling according to a first embodiment of the present invention.

FIG. 8 is a flowchart illustrating a method for operating based on delay tolerance information handling according to a first embodiment of the present invention.

Referring to FIG. 8, a base station determines whether delay tolerance information needs to be acquired (S810). The base station's frequently requesting the delay tolerance information to the UE may be actually inefficient in that unnecessary message exchange may occur even under a situation in which a delay tolerance characteristic of the UE is not changed. Therefore, whether to perform the base station's requesting the delay tolerance information to the UE may be implemented to be determined according to a specific reference.

In more detail, it may be verified whether a network overload situation may occur or will occur or the base station may determine that acquiring the delay tolerance information is required through receiving a notification from another network node. When traffic on a radio interface gradually increases and thus exceeds a specific threshold, the base station may determine that acquiring the delay tolerance information is required. When the base station receives a notification that the overload situation is anticipated from an MME or another base station, the base station may determine that acquiring the delay tolerance information is required for the UE.

The base station requests the delay tolerance information to the UE that receives the service from the corresponding base station (S820). To this end, the base station may transmit a message including a delay tolerance information request to the UE.

The message may be an RRC message transmitted through dedicated signaling. The message may be a measurement configuration message including configuration information for measurement and reporting of the UE. The message may be a handover indication message.

The message may be implemented by system information which includes the delay tolerance information and is broadcast-transmitted. In order for UEs to update the system information, the delay tolerance information request is scheduled in the system information and the UE may transmit a specific indication indicating that the system information is required to be received and updated, which is included in the specific RRC message (preferably, a paging message). Alternatively, the specific indication may indicate occurrence of the network overload situation. The UE receives the indication and verifies the system information according to the indication to receive the delay tolerance information request.

In an implementation example for the delay tolerance information request, under a situation in which network overload has been already serious, the delay tolerance information request is broadcast-transmitted to allow the base station to more efficiently and rapidly acquire the delay tolerance information. On the contrary, the delay tolerance information request through the dedicated signaling may have utility in reducing network signaling overhead.

The UE that receives the request for the delay tolerance information from the base station transmits the delay tolerance information to the base station as a response thereto (S830). The delay tolerance information is generated as follows to be transferred to the base station.

When only a radio bearer (hereinafter, referred to as 'delay tolerance radio bearer') for signaling (e.g., low-priority NAS signaling) which may be delay-tolerated is configured in the UE and a radio bearer (hereinafter, referred to as 'non-delay tolerance radio bearer') for signaling (e.g., general-priority NAS signaling) which may not be delay-tolerated is not configured, the delay tolerance information may be configured to indicate that the UE is the delay tolerant UE having the delay tolerance characteristic.

When the UE is executing only a delay tolerance application and is not executing a non-delay tolerance application, the delay tolerance information may be configured to indicate that the UE is the delay tolerant UE having the delay tolerance characteristic.

When the delay tolerance radio bearer is configured, or the UE is executing the delay tolerance application or the UE is a device used for the delay tolerance application/service, the delay tolerance information may be configured to indicate that the UE is the delay tolerant UE having the delay tolerance characteristic. In this case, the delay tolerance information further indicates other type of radio bearer configured in the UE and/or other type of application/service which is being executed to allow the network to understand an overall state of the UE.

Additionally, the delay tolerance information may indicate a delay tolerance level of the UE. The delay tolerance level may indicate a level regarding which degree the UE may tolerate a delay of service start and/or service interruption. The delay tolerance level may be implemented as a set of specific values. For example, the delay tolerance level may be expressed as integer values of '0' to a predetermined integer 'N'. Level '0' may indicate that the UE may tolerate the lowest level of delay and level 'N' may indicate that the UE may tolerate the highest level of delay.

When the delay tolerance information request is transmitted to the UE while being included in a separate RRC message, the UE may transmit a specific RRC message including the delay tolerance information to the base station as a response thereto. When the delay tolerance information request is transmitted to the UE while being included in a measurement configuration message, the UE may transmit a measurement report message including the delay tolerance information to the base station as a response thereto. When the delay tolerance information request is transmitted to the UE while being included in a handover message, the UE may transmit a handover completion message including the delay tolerance information to the base station. However, in this case, the base station may not be a source base station which is the previous serving base station but a target base station which is a new serving base station.

The base station that acquires the delay tolerance information from the UE operates the network based on the acquired delay tolerance information (S840).

Additionally, the base station that acquires the delay tolerance information from the UE provides the delay tolerance information to the MME to update the delay tolerance information. When the latest delay tolerance information of the UE is updated in the MME, not a serving base station of the current UE but another base station also accesses the MME to acquire the delay tolerance information of the UE.

Figure 9:
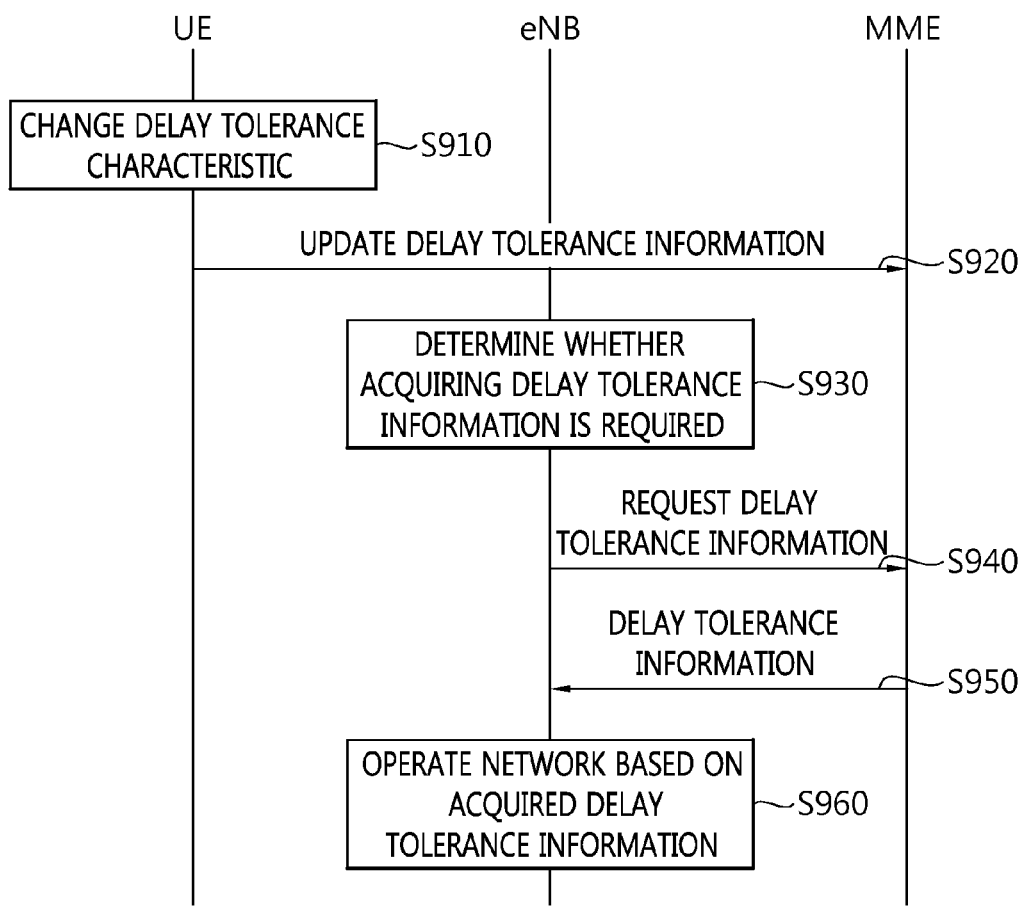
FIG. 9 is a flowchart illustrating a method for operating based on delay tolerance information handling according to a second embodiment of the present invention.

FIG. 9 is a flowchart illustrating a method for operating based on delay tolerance information handling according to a second embodiment of the present invention.

Referring to FIG. 9, a delay tolerance characteristic for UE may be changed (S910). The delay tolerance characteristic may be removed with respect to the UE having the delay tolerance characteristic. The UE that does not have the delay tolerance characteristic may have the delay tolerance characteristic. Whether the UE has the delay tolerance characteristic may be determined based on the following reference.

When only the delay tolerance radio bearer is configured and the non-delay tolerance radio bearer is not configured, it may be considered that the UE has the delay tolerance characteristic.

When the UE is executing only the delay tolerance application and is not executing the non-delay tolerance application, it may be considered that the UE has the delay tolerance characteristic.

When the delay tolerance radio bearer is configured, or the UE is executing the delay tolerance application or the UE is a device used for the delay tolerance application/service, it may be considered that the UE has the delay tolerance characteristic. In this case, when the UE updates the delay tolerance information, the UE may be configured to indicate other type of radio bearer configured in the UE and/or other type of application/service which is being executed. Therefore, the network may understand the overall state of the UE.

When the delay tolerance level of the UE exceeds a specific threshold, it may be considered that the UE has the delay tolerance characteristic. The delay tolerance level may indicate a level regarding which degree the UE may tolerate a delay of service start and/or service interruption. The delay tolerance level may be implemented as a set of specific values. For example, the delay tolerance level may be expressed as integer values of '0' to a predetermined integer 'N'. Level '0' may indicate that the UE may tolerate the lowest level of delay and level 'N' may indicate that the UE may tolerate the highest level of delay.

The UE verifying that the delay tolerance characteristic is changed updates the delay tolerance information (S920). The delay tolerance information may indicate a current state of the delay tolerance characteristic of the UE. The UE transmits the updated delay tolerance information to the MME to update the delay tolerance information of the UE. Alternatively, the UE transmits the updated delay tolerance information to the base station (eNB) to update the delay tolerance information of the UE. The base station that acquires the updated delay tolerance information of the UE may forward the acquired updated delay tolerance information to the MME. Base stations other than the serving base station may also access and use the updated delay tolerance information managed by the MME.

A base station determines whether delay tolerance information needs to be acquired (S930). The base station's frequently requesting the delay tolerance information to the UE may be actually inefficient in that unnecessary message exchange may occur even under a situation in which a delay tolerance characteristic of the UE is not changed. Therefore, whether to perform the base station's requesting the delay tolerance information to the UE may be implemented to be determined according to a specific reference.

In more detail, it may be verified whether a network overload situation may occur or will occur or the base station may determine that acquiring the delay tolerance information is required through receiving a notification from another network node. When traffic on a radio interface gradually increases and thus exceeds a specific threshold, the base station may determine that acquiring the delay tolerance information is required. When the base station receives a notification that the overload situation is anticipated from an MME or another base station, the base station may determine that acquiring the delay tolerance information is required. When the base station receives a notification that delay tolerance characteristic information of at least one UE is updated from the MME, the base station may determine that acquiring the delay tolerance information is required.

The base station requests the delay tolerance information to the MME (S940). To this end, the base station transmits the delay tolerance information request to the MME. Through the delay tolerance information request, the base station may request providing the delay tolerance information on at least one UE. To this end, the delay tolerance information request may include at least one identifier to identify at least one UE.

The MME transmits the requested delay tolerance information on at least one UE to the base station as a response to the delay tolerance information request (S950). The MME may verify at least one UE identifier included in the delay tolerance information request transmitted from the base station and transmit the corresponding delay tolerance information on at least one UE to the base station.

The base station that acquires the delay tolerance information from the MME operates the network based on the acquired delay tolerance information (S960).

In FIG. 9 described above, the MME provides the delay tolerance information on at least one UE according to the request by the base station, but unlike this, the MME may provide the delay tolerance information to the base station without the request by the base station. The MME may determine whether the MME needs to provide the delay tolerance information to the base station of itself. When a radio access network (RAN) overload situation is known from a network node such as the base station, the MME may determine that providing the delay tolerance information is required and in this case, the MME may provide the delay tolerance information to the base station without the request by the base station.

Hereinafter, in the embodiment of the present invention, the method in which the base station acquiring the delay tolerance information of the UE operates the network by using the acquired delay tolerance information will be described in detail.

The base station may perform radio resource management based on the acquired delay tolerance information. As one example, the base station may perform control for the RRC connection establishment state. Under an environment in which overload occurs in the network, the service which may be provided by the base station may be limitative. In such a case, it may be preferable that the base station preferentially provides the service to the non-delay tolerant UE that does not have the delay tolerance characteristic. Accordingly, the base station may release the RRC connection establishment with the delay tolerant UE and preferentially perform the RRC connection establishment with the non-delay tolerant UE if necessary.

The base station may control a procedure associated with mobility of the UE based on the acquired delay tolerance information. During a handover preparation procedure performed between a source base station and a target base station, the source base station may provide the delay tolerance information on the UE which is a target of handover to the target base station. The target base station may know whether the handover target UE is the delay tolerant UE, and as a result, the target base station may determine whether to hand over the corresponding UE or a resource required for the corresponding UE. For example, when the overload situation occurs with respect to the target base station, if the UE is the delay tolerant UE, the target base station may determine not to permit the corresponding UE to be handed over. Therefore, the UE is prevented from accessing the target base station to prevent the overload situation from being aggravated.

The UE may report the delay tolerance information included in a measurement report message together with a measurement result at the time of providing the delay tolerance information to the base station. Meanwhile, when the measurement result included in the measurement report message triggers the hand-over, the source base station may determine whether to perform the hand-over by using the delay tolerance information and forward whether to perform the hand-over to the target base station. When the source base station determines not to perform the hand-over, the source base station may release RRC connection with the UE.

The UE may transmit the delay tolerance information included in a hand-over completion message to a new serving base station at the time of providing the delay tolerance information to the base station. The new serving base station may use the delay tolerance information at the time of managing a radio resource for the UE. For example, the new serving base station may determine whether to maintain or release the RRC connection state with the UE.

According to embodiments of the present invention, a network can obtain latest delay-tolerance information on user equipment and know a delay-tolerance characteristic of the user equipment even when the delay-tolerance characteristic of the user equipment is changed. Therefore, even under an environment in which overload occurs in the network, the network can efficiently manage radio resource by using the delay-tolerance information. That is, the network provides a service by assigning the radio resource to the delay-tolerant user equipment at a comparatively low priority and provides the service by assigning the radio resource to non-delay-tolerant user equipment at a comparatively high priority to efficiently manage the radio resource and provide the service.

Figure 10:
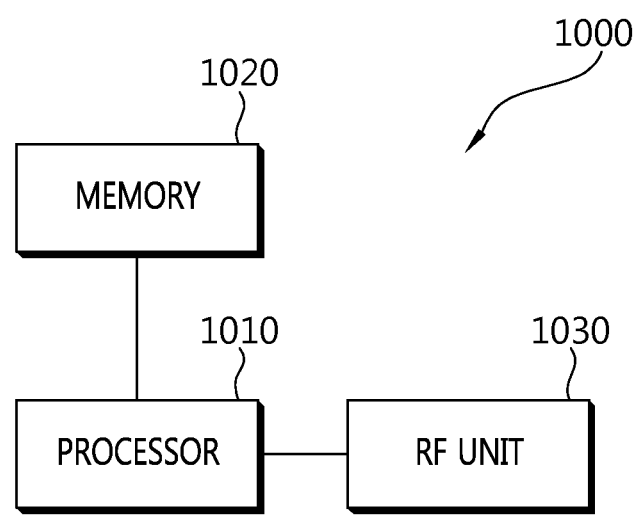
FIG. 10 is a block diagram illustrating a wireless device in which the exemplary embodiment of the present invention is implemented.

FIG. 10 is a block diagram illustrating a wireless device in which the exemplary embodiment of the present invention is implemented. This device may implement the UE and the network device that performs the UE information based operation method according to the exemplary embodiment of the present invention.

Referring to FIG. 10, the wireless device 1000 includes a processor 1010, a memory 1020, and a radio frequency (RF) unit 1030. The processor 1010 implements a function, a process, and/or a method which are proposed. The processor 1010 may be configured to acquire delay tolerance information on the UE. The processor 1010 may be configured to operate the network based on the acquired delay tolerance information. The processor 1010 may be configured to implement the embodiment of the present invention described with reference to FIGS. 8 to 9.

The RF unit 1030 is connected with the processor 1010 to transmit and receive a radio signal.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. An operating method of a serving base station in a wireless communication system, the method comprising:
   determining, by the serving base station, whether acquiring delay-tolerance information is required;
   acquiring, by the serving base station, the delay-tolerance information with respect to a user equipment (UE) when it is determined that acquiring the delay-tolerance information is required; and
   performing, by the serving base station, an operation based on the delay-tolerance information,
   wherein the delay-tolerance information indicates whether the UE is a delay-tolerant UE, which allows a service delay.

2. The method of claim 1, wherein when the serving base station verifies that a network overload environment occurs, it is determined that acquiring the delay-tolerance information is required.

3. The method of claim 1, wherein:
   when a notification that the network overload environment occurs is received from another network node, it is determined that acquiring the delay-tolerance information is required.

4. The method of claim 1, wherein:
   the acquiring of the delay-tolerance information with respect to the UE includes requesting the delay-tolerance information to the UE, and receiving the delay-tolerance information from the UE as a response to the request.

5. The method of claim 1, wherein:
   the acquiring of the delay-tolerance information with respect to the UE includes requesting the delay-tolerance information to a mobility management entity (MME) managing the delay-tolerance information, and receiving the delay-tolerance information from the MME as a response to the request.

6. The method of claim 5, wherein the delay-tolerance information is updated through a network by the UE when a delay-tolerance characteristic of the UE is changed.

7. The method of claim 1, wherein the operation performed by the serving base station includes determining whether to hand over the UE based on the delay-tolerance information.

8. The method of claim 1, wherein the operation performed by the serving base station includes determining whether to release radio resource control (RRC) connection with the UE.

9. The method of claim 1, wherein:
   the operation performed by the serving base station includes forwarding the delay-tolerance information to a target base station for hand-over,
   wherein the target base station determines whether to hand over the UE based on the delay-tolerance information.

10. The method of claim 1, wherein when only a delay-tolerant radio bearer is configured in the UE, the delay-tolerance information indicates that the UE is the delay-tolerant UE.

11. The method of claim 1, wherein when only a delay-tolerance application is executed by the UE, the delay-tolerance information indicates that the UE is the delay-tolerant UE.

12. The method of claim 1, wherein when at least one is satisfied, of a case in which at least one delay-tolerance radio bearer is configured in the UE and a case in which at least one delay-tolerance application is configured by the UE, the delay-tolerance information indicates that the UE is the delay-tolerant UE.

13. The method of claim 12, wherein when other type of radio bearer is configured in the UE or other type of application is executed by the UE, the delay-tolerance information further indicates at least one of the other type of radio bearer and the other type of application.

14. A wireless device that operates in a wireless communication system, the wireless device comprising:
   a radio frequency (RF) unit configured to transmit or receive a radio signal; and
   a processor which operates in functional association with the RF unit,
   wherein the processor is configured to:
   determine whether acquiring delay-tolerance information is required,
   acquire the delay-tolerance information with respect to a user equipment (UE) when it is determined that acquiring the delay-tolerance information is required, and
   perform an operation based on the delay-tolerance information,
   wherein the delay-tolerance information indicates whether the UE is a delay-tolerant UE, which allows a service delay.

15. A delay-tolerance information based operating method performed by a user equipment (UE) in a wireless communication system, the method comprising:
   generating delay-tolerance information; and
   transmitting the delay-tolerance information to a network,
   wherein the delay-tolerance information indicates whether the UE is a delay-tolerant UE, which allows a service delay,
   wherein the network performs an operation based on the delay-tolerance information, and
   wherein the transmitting the delay-tolerance information to the network includes receiving a delay-tolerance information request from a serving base station of the UE, and transmitting the delay-tolerance information to the serving base station as a response to the delay-tolerance information request.

16. The method of claim 15, wherein:
   the generating of the delay-tolerance information includes:
   when a delay-tolerance characteristic of the UE is changed, updating the delay-tolerance information to indicate whether the UE is the delay-tolerant UE according to the delay-tolerance characteristic of the UE, and
   the transmitting of the delay-tolerance information to a network includes when the delay-tolerance information is updated, transmitting the updated delay-tolerance information to the network.

17. A user equipment (UE) that operates in a wireless communication system, the UE comprising:
   a radio frequency (RF) unit configured to transmit or receive a radio signal; and
   a processor which operates in functional association with the RF unit,
   wherein the processor is configured to:
   generate delay-tolerance information; and
   transmit the delay-tolerance information to a network which performs an operation based on the delay-tolerance information,
   wherein the delay-tolerance information indicates whether the UE is a delay-tolerant UE, which allows a service delay, and wherein the delay-tolerance information is transmitted to a serving base station of the UE as a response to a delay-tolerance information request received from the serving base station.

* * * * *